US007043636B2

(12) United States Patent
Smeets

(10) Patent No.: US 7,043,636 B2
(45) Date of Patent: May 9, 2006

(54) DATA INTEGRITY MECHANISMS FOR STATIC AND DYNAMIC DATA

(75) Inventor: Ben Smeets, Dalby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 782 days.

(21) Appl. No.: 09/951,676

(22) Filed: Sep. 14, 2001

(65) Prior Publication Data

US 2002/0038429 A1   Mar. 28, 2002

Related U.S. Application Data

(60) Provisional application No. 60/234,935, filed on Sep. 26, 2000.

(51) Int. Cl.
    *H04L 9/00* (2006.01)

(52) U.S. Cl. ........................ 713/170; 713/165

(58) Field of Classification Search .......... 705/51; 713/170, 165, 185, 175, 176; 726/2
    See application file for complete search history.

(56) References Cited

U.S. PATENT DOCUMENTS

| 4,405,829 A | | 9/1983 | Rivest et al. |
| 4,748,668 A | | 5/1988 | Shamir et al. |
| 5,050,212 A | * | 9/1991 | Dyson .................. 713/187 |
| 5,287,504 A | * | 2/1994 | Carpenter et al. ......... 707/201 |
| 5,442,645 A | | 8/1995 | Ugon et al. |
| 5,606,315 A | | 2/1997 | Gaskins |
| 5,606,609 A | * | 2/1997 | Houser et al. .......... 713/179 |
| 5,629,980 A | * | 5/1997 | Stefik et al. ............ 705/54 |
| 5,689,565 A | | 11/1997 | Spies et al. |
| 5,802,592 A | | 9/1998 | Chess et al. |
| 5,919,257 A | | 7/1999 | Trostle |
| 5,933,851 A | * | 8/1999 | Kojima et al. .......... 711/133 |
| 5,949,882 A | | 9/1999 | Angelo |
| 6,026,293 A | | 2/2000 | Osborn |
| 6,098,079 A | * | 8/2000 | Howard ................ 707/205 |
| 6,269,396 B1 | | 7/2001 | Shah et al. |
| 6,285,985 B1 | | 9/2001 | Horstmann |
| 6,317,659 B1 | | 11/2001 | Lindsley et al. |

(Continued)

FOREIGN PATENT DOCUMENTS

EP          0753816 A1      1/1997

(Continued)

OTHER PUBLICATIONS

Handbook of Applied Cryptology, by Alfred Menezes, Paul van Oorschot and Scott Vanstone, CRC Press, 1996 table of contents (pp. 5-13), pp. 29 and 359-361.

(Continued)

*Primary Examiner*—Gregory Morse
*Assistant Examiner*—Thomas Ho

(57) ABSTRACT

The integrity of a dynamic data object that comprises one or more dynamic data items is ensured by storing the dynamic data object and dynamic authorization data in a memory. The dynamic authorization data may, for example, be a count of how many failed attempts to gain authorization have previously been made, and this is modified at least whenever another failed attempt is made. Whenever the dynamic data object or the dynamic authorization data is changed, its corresponding hash value is recomputed and stored into the memory. The dynamic data object is considered authentic only if newly-generated values of the two hash signatures match those that were previously stored into the memory. Changes to the dynamic data object are permitted only after the user has executed passed an authorization procedure.

36 Claims, 5 Drawing Sheets

U.S. PATENT DOCUMENTS

| | | |
|---|---|---|
| 6,373,498 B1 | 4/2002 | Abgrall |
| 2002/0029378 A1 | 3/2002 | Larsson |
| 2002/0036658 A1 | 3/2002 | Carolan et al. |
| 2002/0038429 A1 | 3/2002 | Smeets |
| 2002/0069065 A1 | 6/2002 | Schmid et al. |
| 2003/0181193 A1 | 9/2003 | Wilhelmsson et al. |
| 2003/0224769 A1 | 12/2003 | Solve et al. |

FOREIGN PATENT DOCUMENTS

| | | |
|---|---|---|
| EP | 0753816 A1 | 1/1997 |
| EP | 0798620 A2 | 10/1997 |
| EP | 0798620 A2 | 10/1997 |
| EP | 1074911 A2 | 2/2001 |
| WO | WO 98/19239 | 5/1998 |
| WO | WO 98/54672 | 12/1998 |
| WO | WO 00/08611 | 2/2000 |
| WO | WO 00/21238 | 4/2000 |
| WO | WO 00/62140 | 10/2000 |
| WO | WO 00/79447 | 12/2000 |
| WO | WO 01/14960 A2 | 3/2001 |
| WO | WO 01/15382 A1 | 3/2001 |
| WO | WO 01/88707 A2 | 11/2001 |
| WO | WO 02/27441 A1 | 4/2002 |
| WO | WO 02/33879 A2 | 4/2002 |
| WO | WO 02/35351 A1 | 5/2002 |

OTHER PUBLICATIONS

Handbook of Applied Cryptography, by Alfred Menezes, Paul van Oorschot and Scott Vanstone, CRC Press, 1996 Table of Contents (pp. 5-13); pp. 29 and 359-361.

Aspects and Crosscutting in Layered Middleware Systems by Lodewijk M.J. Bergmans et al.; Trese Group-Center for Telematics and Information Technology. (CTIT); pp. 1-3.

Supporting the Design of Adaptable Operating Systems Using Aspect-Oriented Frameworks by Paniti Netinant et al.; International Conference on Parallel and Distributed Processing Techniques and Applications (PDPTA 2000); Las Vegas, Nevada; Jun. 26-29, 2000; 7 Pages.

A Layered Approach to Building Open Aspect-Oriented Systems by Paniti Netinant et al.; Communications of the AC; Oct. 2001; vol. 44, No. 10; pp. 83-85.

Aspect-Oriented Programming by Silvia Breu; pp. 1-22.

Draft: Aspect-Design in the Building-Block Method by Jurgen K. Muller; Phillips Research Laboratories; International Workshop on Aspect-Oriented Programming at ECOOP, 1992; 3 Pages.

A Version Model for Spect Dependency Management by Elke Pulvermuller et al.; J. Bost (Ed.):GSCE 2001, LNCS 2186, Springer-Verlang Berlin Heidelberg 2001, pp. 70-79.

Can AOP Support Extensibility in Client-Serer Architectures? by Yvonne Coady et al.; European Conference on Object-Oriented Programming (ECOOP); Aspect-Oriented Workshop, Jun. 2001; pp. 1-4.

Mapping Requirements to Architecture: an Experience Report from the VIVIAN Project by Titos Saridakis; Proceedings of the 14th International Conference on Software and Systems Engineering and their Applications, Dec. 2001; pp. 1-6.

Functionlaity Needed in Middleware for Future Mobile Computing Platforms by Kimmo Raatikainen; Middleware for Mobile Computing Workshop held at IFIP/ACM Middleware Conference, Heidelberg, Germany, 2001; 10 Pages.

HMAC: Keyed Hasing for Message Authentication by Krawczyk et al..; Feb. 1997; pp. 1-11.

* cited by examiner

DATA INTEGRITY MECHANISMS FOR STATIC AND DYNAMIC DATA

CROSS REFERENCE TO RELATED APPLICATIONS

This application claims the benefit of U.S. Provisional Application No. 60/234,935, filed Sep. 26, 2000, which is hereby incorporated herein by reference in its entirety.

BACKGROUND

The invention relates to a system for preventing electronic memory manipulation, and in particular, to methods and apparatuses for preventing unauthorized manipulation of desirably secure memory contents in an electronic device.

The invention disclosed herein relates to any electronic device whose memory contents are to be maintained in a secure or preferably unaltered state. Such a requirement may be necessitated by security reasons, such as preventing fraudulent manipulation of a cellular telephone memory, or for the purposes of maintaining the integrity of electronic device operation in critical applications such as aircraft control or medical instrument operation. As disclosed and described herein, exemplary aspects of the invention are set out in the context of a system and method for securing one or more electronic memories within a cellular telephone. Also described herein is a system that permits access to, and manipulation of, one or more electronic memories in an electronic device, by use of a data transfer device that undergoes an authentication process before being permitted to access an electronic memory. The latter system is also described in the context of a cellular telephone application. Even though exemplary embodiments of the invention disclosed herein are described in the context of a secure cellular telephone memory and a means for securely accessing and altering memory contents in a cellular telephone, it will be readily appreciated by those skilled in the art that systems in accordance with the invention can be applied to any electronic system having one or more memories whose contents are to remain unaltered, or whose memories are to be accessed and possibly modified only by authorized means. Consequently, the scope of the invention is not intended to be limited by the exemplary embodiments set out herein, but rather by the claims appended hereto and equivalents thereof.

In many fixed and mobile computing and communication systems such as personal digital assistants (PDAs) and cellular telephones, there is a need to protect certain data stored in the memory of the system. This data may be the data corresponding to a document, database, or program. In the context of a cellular telephone, the data may represent information such as the International Mobile Equipment Identity (IMEI) number (as specified by the ETSI GSM specification), radio calibration data, and encrypted access codes. Once stored in the memory, this type of data is not expected to change, and is therefore referred to herein as static data. Other types of data may also be stored in the memory, such as data representing a status indication of whether the GSM phone is locked onto a specific operator's network or not. This type of data, referred to herein as dynamic data, has the potential of being modified by the user, but only if the user is authorized to make the modification. In all other cases, the dynamic data should not be permitted to change.

Techniques for ensuring the integrity of static data (i.e., for preventing the static data from being tampered with) have been described, such as those presented in U.S. Pat. Nos. 5,442,645 and 6,026,293, which are hereby incorporated herein by reference in their entireties. These methods variously use cryptographic techniques for creating so-called "signatures" from the static data. Cryptographic techniques are known and described in such publications as Handbook of Applied Cryptology, by A. Menezes, P. C. an Orrshot, and S. A. Vanstone, CRC Press, 1996, which is hereby incorporated herein by reference in its entirety. The signatures are created and stored at a time when the static data is known to be authentic. Then, before the user is permitted to utilize the static data, the signature is again computed and compared with the previously stored version. Any mismatch is taken as evidence that the static data has changed and is not to be used.

In U.S. Pat. No. 5,442,645 a secret key needs to be stored in order to realize the integrity protection. A more elaborate technique is described in U.S. Pat. No. 6,026,293. This will now be briefly described in connection with the block diagram of FIG. 1. In this system, an ASIC that includes processing circuits 100 is interconnected with a flash program memory 101, a random access memory (RAM) 103 and an electrically erasable programmable read-only memory (EEPROM) 105 by means of a system bus 107. The processing circuits 100 include a microprocessor 109, a timer and controller logic 111, and two forms of memory: protected static RAM (PSRAM) 113 and an internal read-only memory (IROM) 115. In addition to the traditional boot code 117, the IROM 115 stores a public key 119, program code for the hash algorithm (denoted hash code 121) and program code for the device authentication code 123. Static data 125 is stored in the EEPROM 105. The static data 125 is protected by audit hash values 127 that are also stored in the EEPROM 105. The audit hash values 127 are computed by the hash algorithm implemented by the hash code 121 stored in the processing circuit's IROM 115. Access to the EEPROM's contents by an external data transfer device is controlled through the use of an authentication procedure using the public key 119 and authentication code 123 stored in the IROM 115. The authentication process requires that the data transfer device be in possession of the corresponding secret key of the public/private encryption scheme that is used to implement the authentication procedure. A timer mechanism, implemented by means of the timer and control logic 111, is used to trigger the processing circuit's performance of perform integrity checks at certain moments of time as determined by a set of counters.

A disadvantage with existing methods is that the software that performs the integrity checking must itself be secured, since any way to modify the integrity checking software can be used to bypass the security mechanism. In the technique described in U.S. Pat. No. 6,026,293 this requirement is satisfied by fixing the code of the software in the IROM of the processing circuit ASIC. However, in order to be able to employ this technique, the system developer must be capable of defining parts of the ASIC. This capability increases the cost of this component.

Another disadvantage with these known techniques is that they are not readily applicable to the problem of ensuring the integrity of dynamic data.

In U.S. Pat. No. 5,606,315, a mechanism is described wherein access to a dynamic data object is controlled via a password that is stored in EEPROM. However, the user can easily read the password from the EEPROM and thereby get access to the capability of modifying the dynamic data. Moreover, in the system described in this document, the dynamic data is not checked for integrity.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that ensure the integrity of a dynamic data object that comprises one or more dynamic data items. Accomplishing this includes storing the dynamic data object and dynamic authorization data in a memory. Different hash signatures are generated for the dynamic data object and the dynamic authorization data, respectively, and these are stored in the memory as well. When a user wishes to modify the dynamic data object, a determination is made whether the user is authorized to modify the dynamic data object. If the user is authorized, then the dynamic authorization data is modified (e.g., a failed attempt counter is incremented) and a new hash signature is generated for the dynamic authorization data. These are then stored back into the memory.

If the user is authorized to modify the dynamic data object, then the modification is permitted to be made. The corresponding hash signature is then recomputed and stored back into the memory as well. The dynamic data object is considered authentic only if newly-generated values of the two hash signatures match those that were previously stored into the memory.

BRIEF DESCRIPTION OF THE DRAWINGS

The objects and advantages of the invention will be understood by reading the following detailed description in conjunction with the drawings in which.

DETAILED DESCRIPTION

Figure 1:
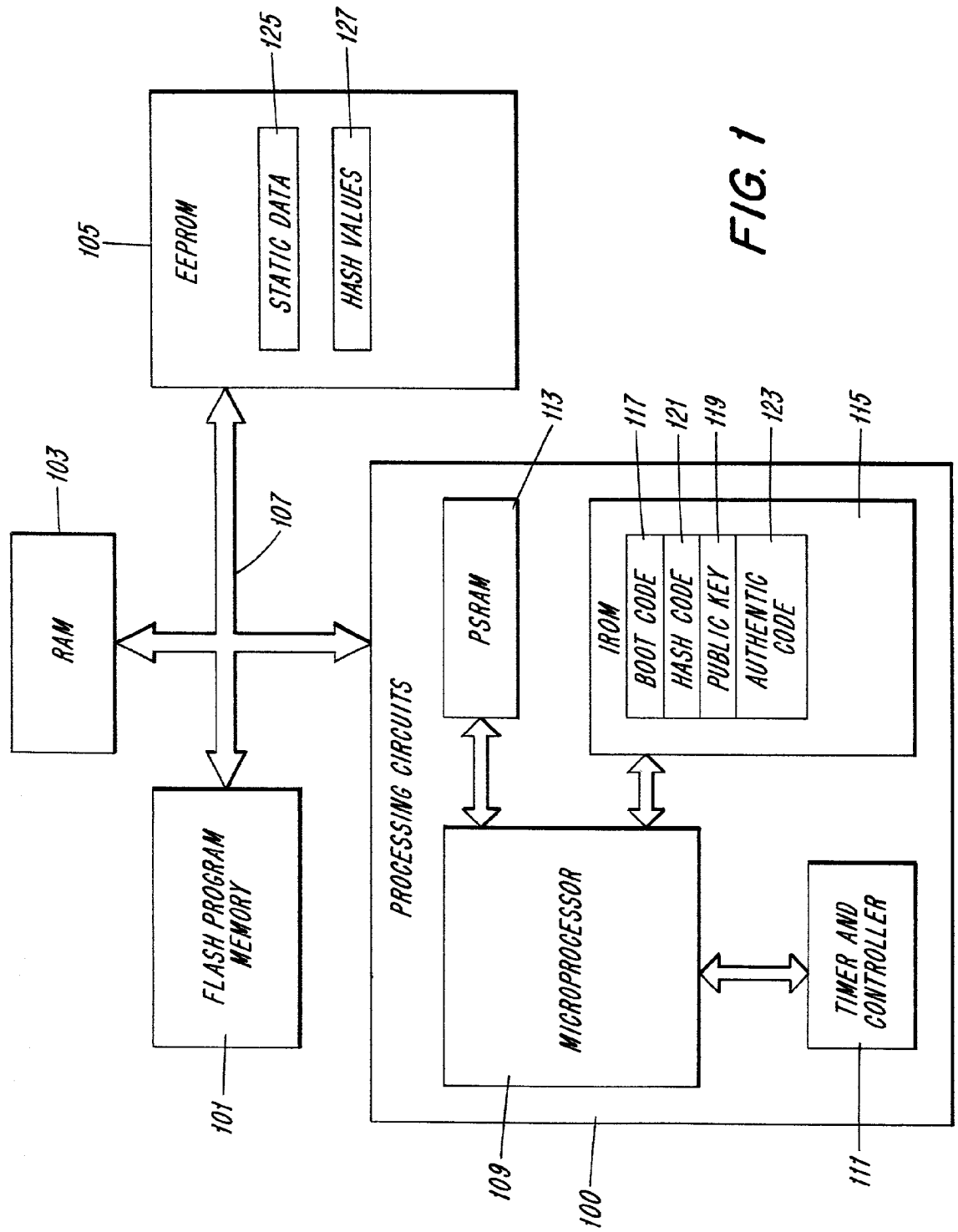
FIG. 1 is a block diagram of a conventional apparatus for protecting the integrity of static data stored in a memory.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

In one aspect of the invention, methods and apparatuses are provided that protect a system against unauthorized changes of data stored in an internal memory of the system. In particular, the inventive techniques address the problem of providing protection of two types of data: static data and dynamic data. As explained earlier, static data is data that should not be changed after it has been loaded into the system. (In some instances, it may be desirable to permit static data to be changed at, for example, an authorized service center for the device in question. This possibility does not alter the fact that the user of the device is never permitted to alter the data.) By contrast, dynamic data is data that the user of the device may be permitted to modify, but only if he or she is given the authority to do so (e.g., by a system operator). Both types of data should be protected against unauthorized changes. However, the data integrity mechanism should not prevent the user from modifying dynamic data when authorization has been granted. Additionally, it may also be desirable to prevent both types of data from being copied (i.e., cloned) to other devices.

To facilitate explaining the various principles of the invention, we let Ms denote the one or more static data items that need protection, and let Md denote the one or more dynamic data items that need protection. An authorization mechanism should be provided to permit authorized modifications to be made to the dynamic data Md. In an exemplary embodiment of such an authorization mechanism, the user is required to correctly supply an access code in order to be permitted to modify the dynamic data. In this exemplary embodiment, the access code is stored in unreadable form in the system's memory as static data. The access code itself is a string of randomly chosen symbols. The access code may be made unreadable by encrypting its data via an encryption algorithm E using a secret key Ke. A suitable choice for E might be the Data Encryption Standard (DES) algorithm in triple mode as described, for example, in the above-referenced book by A. Menezes et al. However, any other secure encryption algorithm may alternatively be used. The size of the secret key Ke should be long enough to prevent an exhaustive key search. Using current technology, at least 64-bits should be employed. For triple DES, the key size is 112 bits. Since the access codes may be entered manually by the user of the system, the size (in terms of the number of symbols to be entered) may be relatively small. For example, in the case of dynamic data defined by the GSM standards, such a code would consist of, at most, eight decimal digits.

Because of the relatively small size of the access code, this authorization method could be vulnerable to an exhaustive guess-and-try attack. To prevent such a brute force approach, it is preferable to further provide a mechanism that limits the number of times that a user is permitted to continue entering incorrect access codes. This may be accomplished by providing a false-attempt counter that keeps track of the number of unsuccessful access code entries. Let TryCnt denote the number of failed attempts to enter the correct access code. The system can be designed to lock up when the counter reaches a predetermined limit. Depending on the desired level of security designed into the system, it may or may not be possible to take the system out of this lockup state. For example, the user may be forced to bring the system to a special service center where the unlocking can be performed under secure controlled conditions.

In view of the above, some mechanism for ensuring the integrity of the static data Ms is needed not only to protect those portions of the static data that are attributable to system-defined parameters (e.g., IMEI in GSM) but also to protect the unchanging elements that make up the dynamic data's authorization method, such as the data that represents the maximum number of unsuccessful access code entry attempts that will be permitted ("predetermined limit") as well as the program code implementation of the authorization method itself.

It can also be seen that some mechanism for ensuring the integrity of the dynamic data is needed not only to protect those portions of the dynamic data that are attributable to system-defined parameters (e.g., the status indication of whether a GSM phone is locked onto a specific operator's network or not), but also to protect those aspects of the authorization mechanism that change over time, such as the failed attempt counter, TryCnt, which must be adjusted (e.g., incremented) with each unsuccessful access code entry attempt. If the variable TryCnt were not protected, an unscrupulous user could, with relative ease, reset the counter, thereby achieving the capability of entering an unlimited number of trial codes. The failed attempt counter (TryCnt) and all other variables stored in the exposed memory that change with an access attempt are referred to collectively herein as dynamic authorization data, and denoted Md_auth.

The integrity of the data objects Ms, Md, and Md_auth may be achieved as follows. Dealing first with the data object Ms, to the data object Ms we associate a static audit hash value, or signature, Ss. The audit hash value Ss is calculated by using a hash algorithm, denoted Hs, on Ms (or at least on parts of it). The value of Ss is stored in a non-volatile memory. In some embodiments, the value Ss may be stored together with the data object Ms in flash program memory during the manufacturing process. In alternative embodiments, and as will be assumed in the rest of this description, the data objects Ms and Ss are stored in EEPROM. This has the advantage of making it possible to install the protected data object Ms after the manufacturing process has been completed.

To prevent the user from performing the same operations, the processing circuit of the system preferably contains an authentication mechanism, such as the one disclosed in the above-identified U.S. Pat. No. 6,026,293 in combination with, for example, the algorithm disclosed in U.S. Pat. No. 4,748,668, which is hereby incorporated herein by reference in its entirety. However, in accordance with an aspect of the invention, the authentication mechanism is applied not only for the purpose of providing controlled access to the memory contents (as is taught in U.S. Pat. No. 6,026,293), but also for the purpose of controlling the capability of executing the hash algorithm Hs.

As mentioned earlier, it may also be desirable to prevent the copying (i.e., cloning) of data from one device to another. To bring about this aspect of protection, the value of Ss as calculated by the algorithm Hs from the data object Ms is further made to be a function of a static parameter which is preferably a device serial number (herein denoted SerNo) that has been stored in the processing circuit or the flash memory. In preferred embodiments, each realization of a system is given a unique SerNo value. In alternative embodiments, limited numbers of realizations of a system may be assigned the same SerNo value, with different lots of systems being assigned unique SerNo values. The use of a SerNo value as one of the input parameters to the hash algorithm Hs results in it being virtually impossible for the protected data from one system to be reused on, or cloned to, another similar system. It should be noted that this method of achieving data integrity protection does not require the storage of a secret key. This is a great advantage, since storing secret keys in a secure manner requires expensive techniques to realize tamper resistance.

Turning now to the protection of dynamic data, two dynamic audit hash values are used. A first dynamic audit hash value, denoted Sd, protects the dynamic data object Md and is calculated by a first dynamic hash algorithm denoted Hd. A second dynamic audit hash value, denoted S'd, protects the dynamic authorization data (Md_auth) and is calculated by a second dynamic hash algorithm denoted Hd_auth. It is possible to use different hash algorithms for Hd and Hd_auth. However, in other embodiments it may be more efficient to use identical algorithms (Hd=Hd_auth) so long as they generate different signature values. This last result may be achieved by using different input parameters to generate the second dynamic audit hash value (S'd) than are used to generate the first dynamic audit hash value (Sd). For example, the first dynamic audit hash value may be generated by determining Sd=Hd(Md), whereas the second dynamic audit hash value may be generated by determining S'd=Hd(Md_auth). This aspect of the invention will be illustrated further below in connection with a number of exemplary embodiments.

The purpose of having two distinctly different audit hash values is as follows. Every time a user tries to gain access to the capability of modifying the non-combined dynamic data Md, he or she needs to enter the required access code. However, before the authorization mechanism can be employed, the integrity of the values of Md and Md_auth (e.g., TryCnt) must first be confirmed. If Md and Md_auth pass this check but the user enters the wrong access code, the data object Md_auth will be adjusted (e.g., the variable TryCnt may be incremented). Since the second dynamic audit hash value S'd is a function of Md_auth, it must be recomputed and stored back into non-volatile memory. The first dynamic audit hash value Sd does not have to be recomputed if it is not a function of the dynamic data object Md_auth.

If, alternatively, Md and Md_auth pass the integrity check and the user enters the correct access code, then the user may change the dynamic data that make up Md. Since the first dynamic audit hash value Sd is a function of Md, it must be recomputed. As will be seen below, in some embodiments the second dynamic audit hash value S'd is also a function of Md, and in these cases this must also be recomputed at this time.

A malicious user who wants to change Md without knowing the access code may attempt to circumvent the integrity mechanism by making repeated access attempts and recording any changes that occur in the dynamic data Md, the dynamic authorization data Md_auth and their associated dynamic audit hash values (Sd and S'd). With this knowledge, this user may be able to learn about the properties of the protection mechanism. However, at most this user will see properties related to the generation of the second dynamic audit hash value, S'd, but will not see any change in the first dynamic audit hash value, Sd, because this cannot occur until the correct access code has been entered. (It is assumed that a user who enters a correct access code is authorized, and therefore does not gain anything by learning how the first dynamic audit hash value Sd has been changed.) This aspect of the invention adds to the security of the protection mechanism and is the reason for having audit hash values for both the dynamic data object, Md, and the dynamic authorization data, Md_auth.

Figure 2:
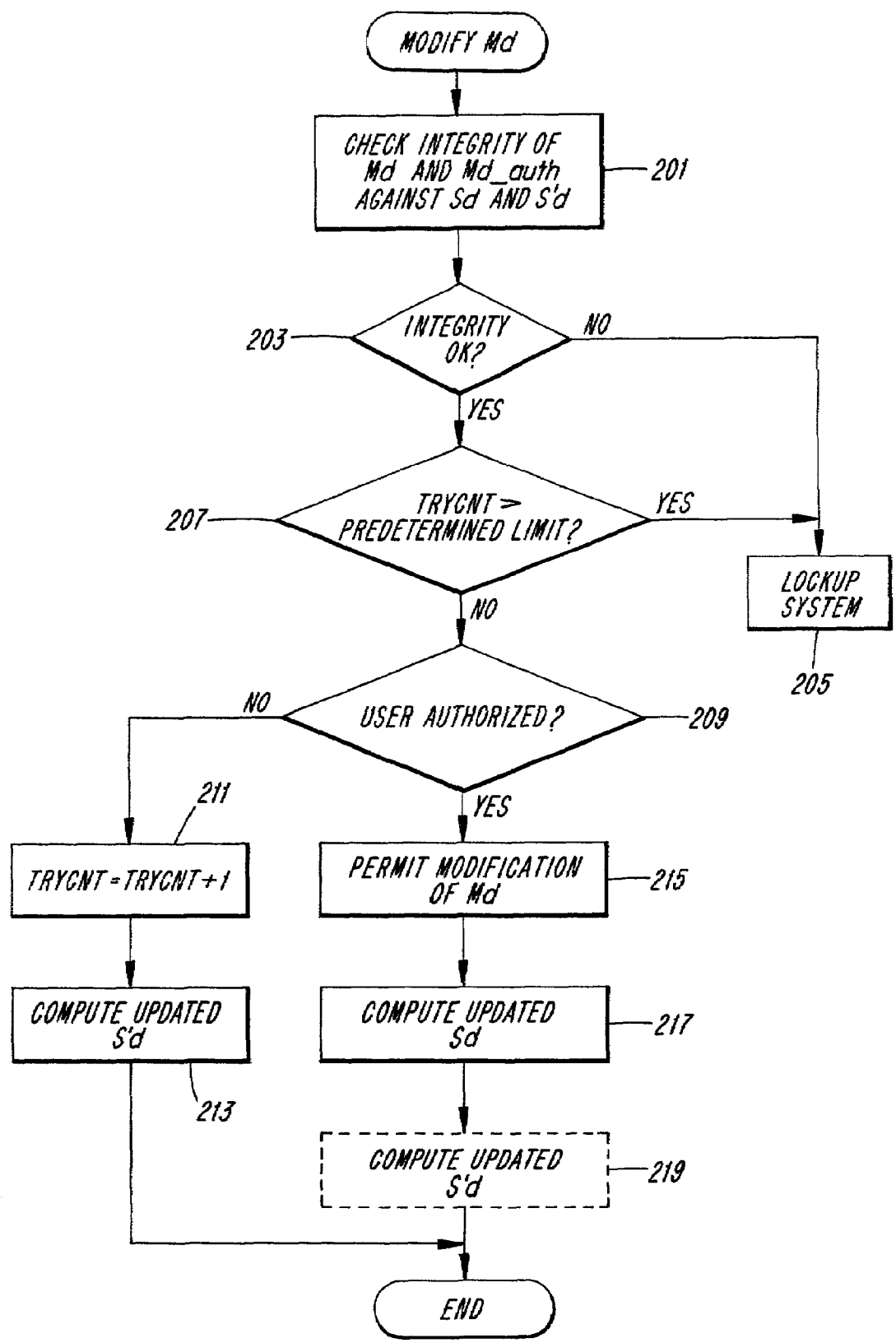
FIG. 2 is a flow chart depicting a technique for ensuring that only authorized modifications are made to a dynamic data object, Md, in accordance with an embodiment of the invention.

FIG. 2 is a flow chart depicting a technique for ensuring that only authorized modifications are made to a dynamic data object, Md, in accordance with an embodiment of the invention. In this exemplary embodiment, no modification will be permitted if an unauthorized change to the dynamic data object has already been made, so the first thing that is done is to generate an expected values of the first and second dynamic audit hash value and to compare these with the stored ones, Sd and S'd respectively (step 201). If either one of the expected values does not match the corresponding stored one ("NO" path out of decision block 203), an unauthorized modification is declared and appropriate steps are taken, such as locking up the system (step 205).

If alternatively both of the expected dynamic audit hash values match the corresponding stored values ("YES" path out of decision block 203), then both the dynamic data object Md and the dynamic authorization data, Md_auth (e.g., the TryCnt) have passed the integrity check, and the modification routine is permitted to proceed.

Next, the routine determines whether the user is authorized to make a modification. In this embodiment, this includes determining whether the number of previously made failed attempts to obtain authorization to modify the dynamic data object exceeds a predetermined limit (decision block 207). Thus, the dynamic authorization data, Md_auth, in this embodiment comprises a counter value, TryCnt. If the present value of TryCnt is greater than predetermined limit ("YES" path out of decision block 207), no further attempts will be permitted, and the system is put into a lockup state (step 205).

If the number of failed attempts does not exceed the predetermined limit ("NO" path out of decision block 207), the authorization routine continues by determining whether the user is authorized to make a modification (decision block 209). This may be done in any of a number of ways. For example, as described earlier, the user may have to supply an access code that is compared with a previously stored value. The particular authorization technique used is not an essential aspect of the invention, however, and others could alternatively be used. For example, the user may be required to insert a valid keycard or other hardware security device. In other alternatives, some physical attribute of the user, such as a fingerprint, may be checked in order to establish that this user is the one who has been authorized.

If the user does not pass the authorization check ("NO" path out of decision block 209), the dynamic authorization data Md_auth is adjusted, which in this case means incrementing the failed attempt counter, TryCnt (step 211), so that it will indicate yet another failed attempt having been made. Since the second dynamic audit hash value S'd is a function of the failed attempt counter, it too is recomputed and stored back into the memory (step 213).

If the user does pass the authorization check ("YES" path out of decision block 209), the modification of the dynamic data object Md is then permitted (step 215). Following this modification, the first dynamic audit hash value Sd is recomputed and stored back into the memory (step 217), since it is a function of the dynamic data object Md. In some embodiments, it is advantageous for the second dynamic audit hash value, S'd, to be a function not only of the dynamic authorization data, but also of the dynamic data object Md. This may be helpful, for example, to make it more difficult for a malicious user to determine the mapping between the dynamic authorization data and the second dynamic audit hash value. In such cases, or if the TryCnt is adjusted (e.g., reset to an initial value) whenever an authorized modification is made to the dynamic data object Md, the second dynamic audit hash value S'd needs to be recomputed and stored back into the memory as well (optional step 219).

The above-described technique is but one of many possible embodiments that are all in accordance with the invention. For example, it is not essential that the integrity of the dynamic data object Md and of the dynamic authorization data Md_auth be checked prior to determining whether the user is authorized to make the modification. Alternative embodiments can be created in which the integrity check is performed at other instants prior to performing the user's desired modification, such as after the user has proven himself to be authorized, or after the TryCnt is found not to have reached its predetermined limit but before the user has proven himself to be authorized.

Figure 3:
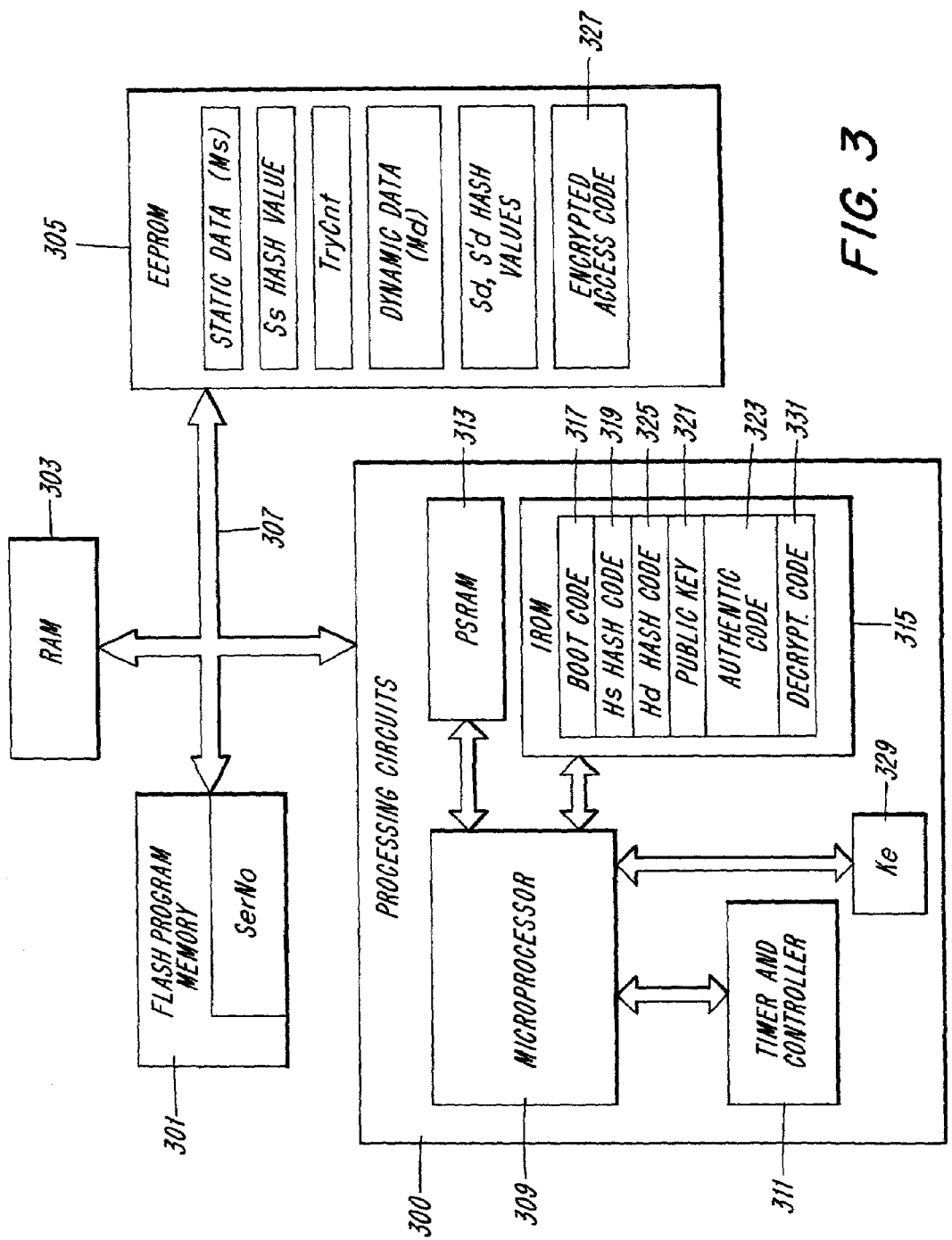
FIG. 3 is a block diagram of an apparatus for protecting the integrity of dynamic data stored in a memory in accordance with one embodiment of the invention.

The above-described techniques can be carried out in a number of different ways. A first embodiment will now be described in connection with the block diagram of FIG. 3. In this system, an ASIC that includes processing circuits 300 is interconnected with a flash program memory 301, a RAM 303 and an EEPROM 305 by means of a system bus 307. The processing circuits 300 include a microprocessor 309, a timer and controller logic 311, and two forms of memory: PSRAM 313 and an IROM 315. The IROM 315 stores boot code 317 as well as other data that are described in greater detail below.

The discussion will now focus on those aspects of this embodiment that are associated with ensuring the integrity of the static data, Ms, which is stored along with its associated static audit hash value, Ss, in the EEPROM 305. As explained earlier, the static audit hash value, Ss, is generated by a static hash algorithm, Hs, whose program code 319 is stored in the IROM 315. The value of the static audit hash value Ss that is stored in the EEPROM 305 may be generated outside the system prior to transferring the static data, Ms, into the EEPROM 305, or it may alternatively be generated by the processing circuits 300 when the static data object Ms is first transferred into the EEPROM 305. In this latter case, the access to the capability of executing the program code 319 for the hash algorithm Hs and having its calculated value stored into the non-volatile memory (e.g., the EEPROM 305) outside of the processing circuits 300 is preferably controlled by an authentication procedure. A public/private key encryption scheme may be used for this purpose. The program code 323 and public key 321 for the authentication procedure are stored in the IROM 315 of the processing circuits 300.

As explained earlier, the value of the static audit hash code Ss, as computed by the static hash algorithm Hs, is a function not only of which static hash algorithm is employed, but also on the values of the input parameters. It is possible to calculate Ss strictly as a function of the static data, Ms. However, in this embodiment it is preferable to also protect against cloning. To achieve this protection as well, the input parameters to the static hash algorithm Hs are the static data Ms and a unique (or nearly unique) static parameter, such as the SerNo parameter described earlier. This may be formally expressed as $$Ss=Hs(Ms, SerNo)$$

The value of the SerNo may be stored into the flash program memory 301 at the time that the flash program memory 301 is manufactured, and should be done in such a manner that it cannot be changed.

After the static audit hash value Ss has been stored in the EEPROM 305, the program code 319 for the static hash algorithm Hs is executed whenever it is desired to ensure that the static data Ms stored in the EEPROM 305 has not been changed. This may, for example, be performed periodically under the direction of the timer and controller logic 311. The static data Ms and the SerNo are supplied as inputs to the static hash algorithm Hs. The newly generated static audit hash value, which never appears outside of the processing circuits 300, is then compared with the static audit hash value Ss stored in the EEPROM 305. Any mismatch indicates that the static data Ms has been changed.

The discussion will now focus on those aspects of this embodiment that are involved in ensuring the integrity of the dynamic data Md. The dynamic data object Md is stored in the EEPROM 305 together with dynamic authorization data (which, in this case, is a failed attempt counter, TryCnt), and the first and second dynamic audit hash values, Sd and S'd. A single dynamic hash algorithm Hd, whose program code implementation 325 is stored in the IROM 315, calculates the expected first or second dynamic audit hash value, Sd or S'd, depending on what input parameters it receives.

The initial values of the first and second dynamic audit hash values, Sd and S'd, may be computed either outside the system prior to transferring the dynamic data Md into the memory of the system (e.g., EEPROM 305), or alternatively inside the processing circuits 300 when the dynamic data object Md is transferred into the memory of the system but after the static data objects Ms and Ss have already been stored.

The value of the first dynamic audit hash value, Sd, as computed by the dynamic hash algorithm Hd, is a function of the dynamic data object Md but is preferably not a function of the failed attempt counter value, TryCnt. In a preferred embodiment, the first dynamic audit hash value Sd depends on Hd itself and the values of Md and Ss. This may be formally expressed as:

$$Sd=Hd(Md, Ss)$$

It will be observed that, because Ss is itself a function of SerNo, Sd is also a function of SerNo.

The value of the second dynamic audit hash value, S'd, is similarly computed by the dynamic hash algorithm Hd as a function at least of the dynamic authorization data Md_auth, which in this case is the failed attempt counter value TryCnt. In order to make the protection scheme more difficult to reverse engineer however, the second dynamic audit hash value S'd preferably depends on Hd itself and the value of Md, SerNo and TryCnt. This may be formally expressed as $$S'd=Hd(Md, SerNo, TryCnt)$$

In order to be declared valid, the dynamic data Md must pass two tests. In one of these, the stored data is checked by the processing circuits 300 by computing at given controlled instants an expected first dynamic audit hash value. This computed value, which is never presented outside of the processing circuits 300, is compared with the first dynamic audit hash value Sd that was previously stored in the EEPROM 305. If the two values differ from one another, then the dynamic data Md is declared as being modified.

In a second test, the stored data is checked by the processing circuits 300 by computing at given controlled instants an expected second dynamic audit hash value. This computed value, which also is never presented outside of the processing circuits 300, is compared with the second dynamic audit hash value S'd that was previously stored in the EEPROM 305. Again, if the two values differ from one another, then the dynamic data Md is declared as being modified. It should be noted that even if the second dynamic audit hash value S'd is not a function of the dynamic data object Md, a mismatch indicates that the dynamic authorization data (e.g., the failed attempt counter value TryCnt) has been tampered with. Consequently, it must also be assumed that the dynamic data object Md has been modified without authorization.

The dynamic data object Md is considered to be authentic (i.e., not having been modified without authorization) only if both of the tests are passed successfully. If the dynamic data object Md has been authenticated, the user can get access to the capability of modifying it by successfully completing the access procedure. In the exemplary embodiment described herein, the access procedure involves the user's entering an access code through an input device such as a keypad (not shown). The expected access code 327 is stored in encrypted form in the EEPROM 305 and is then encrypted inside the processing circuits 300 using a secret key Ke 329 and a decryption algorithm whose program code 331 is stored in the IROM 315.

If the user successfully completes the access procedure and modifies the dynamic data object Md, then the dynamic hash algorithm 325 is executed to compute new values for both the first and second dynamic audit hash values Sd and S'd. (In embodiments in which the second dynamic audit hash value is not a function of the dynamic data object Md, it is only necessary to compute a new value for the first dynamic audit hash value if the dynamic authorization data—e.g., the failed attempt counter value TryCnt—has not also been changed.) These new values are then stored into the EEPROM 305 for use during a next dynamic data integrity check. As mentioned earlier, the presentation of these values onto the bus 307 is considered to be safe because the user has just proven that he or she is authorized and is therefore not acting maliciously.

If the user fails in an access attempt, it is necessary to update the dynamic authorization data (in this case the failed attempt counter, TryCnt), which is stored in the EEPROM 305. Upon making this update, the stored value of the second dynamic audit hash value S'd will no longer be valid, since it is a function of TryCnt. Accordingly, the dynamic hash algorithm Hd must be executed to recompute a new value for the second dynamic audit hash value S'd. This new value is then stored into the EEPROM 305. While doing this places the second dynamic audit hash value S'd on the bus 307 and therefore has the potential of exposing the second dynamic audit hash value S'd to a malicious user, this will not give the user enough information to determine how to circumvent the dynamic data integrity checking mechanism because he or she will still lack information that indicates how the first dynamic audit hash value Sd can be computed. Since both the first and second dynamic audit hash values are necessary to successfully complete the dynamic data integrity checking mechanism, the system is secure.

Figure 4:
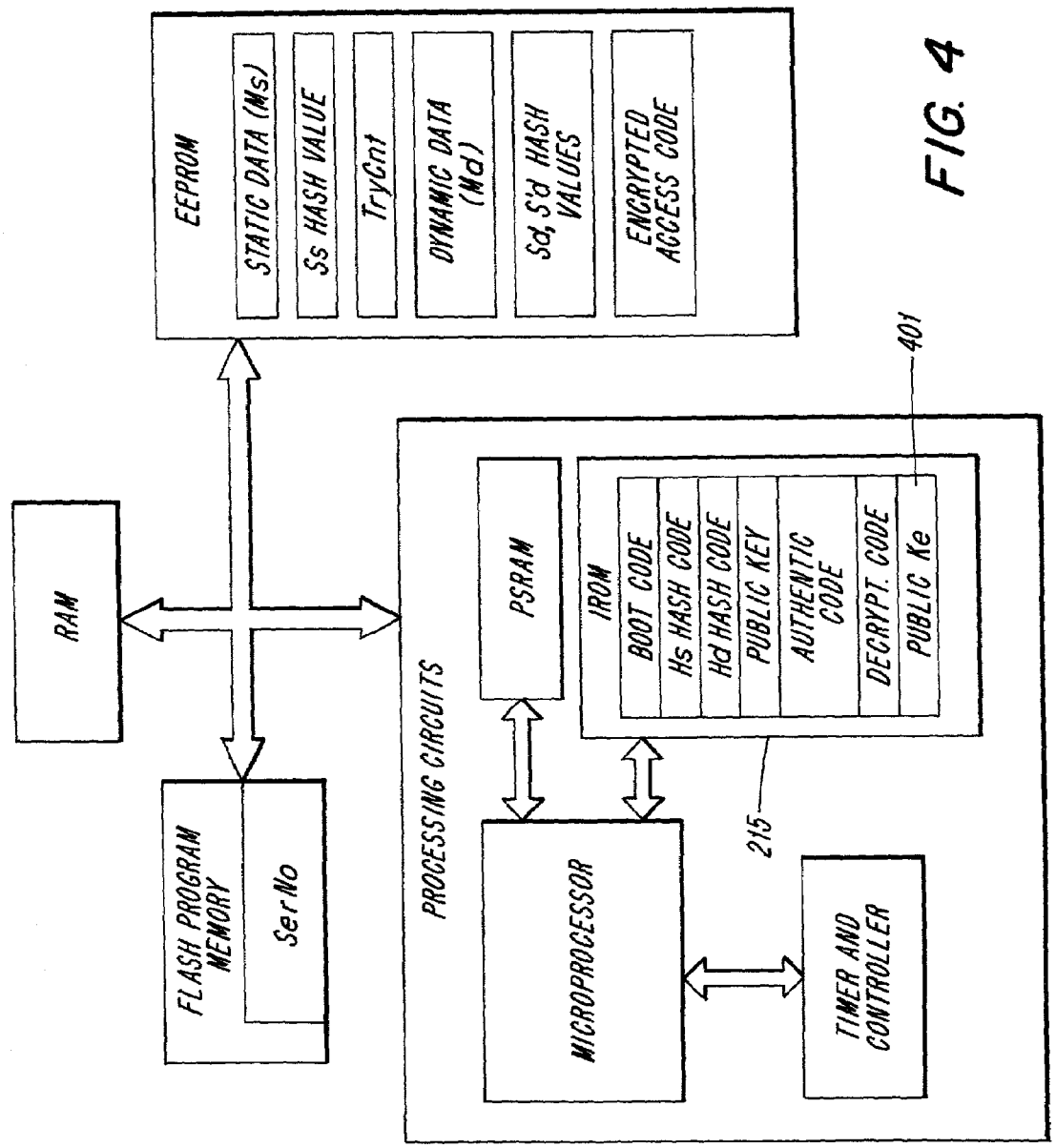
FIG. 4 is a block diagram of an apparatus for protecting the integrity of dynamic data stored in a memory in accordance with an alternative embodiment of the invention.

An alternative embodiment of the invention is illustrated in the block diagram of FIG. 4. In this embodiment, the costly security arrangements associated with having a secret key Ke are avoided by instead using a public/private cryptography system for the protection of the access code. This embodiment differs from the one shown in FIG. 3 in that a second public key 401 is stored in the IROM 215. It is the public nature of the second public key 401 that permits it to be stored in the IROM 215. By contrast, the requirement to maintain the secrecy of the secret key Ke 329 of FIG. 3 makes it necessary for this key to be stored securely against undesired read-out.

The second public key 401 can be made public without compromising the matching secret key, which is used by the manufacturer. Thus, in this embodiment, it is possible to avoid the expensive techniques that would otherwise be needed to securely store secret keys.

A system and method such as that taught in U.S. Pat. No. 4,405,829 may be used to effect the secure access system for the embodiment of FIG. 4. U.S. Pat. No. 4,405,829 is hereby incorporated by reference herein in its entirety.

Figure 5:
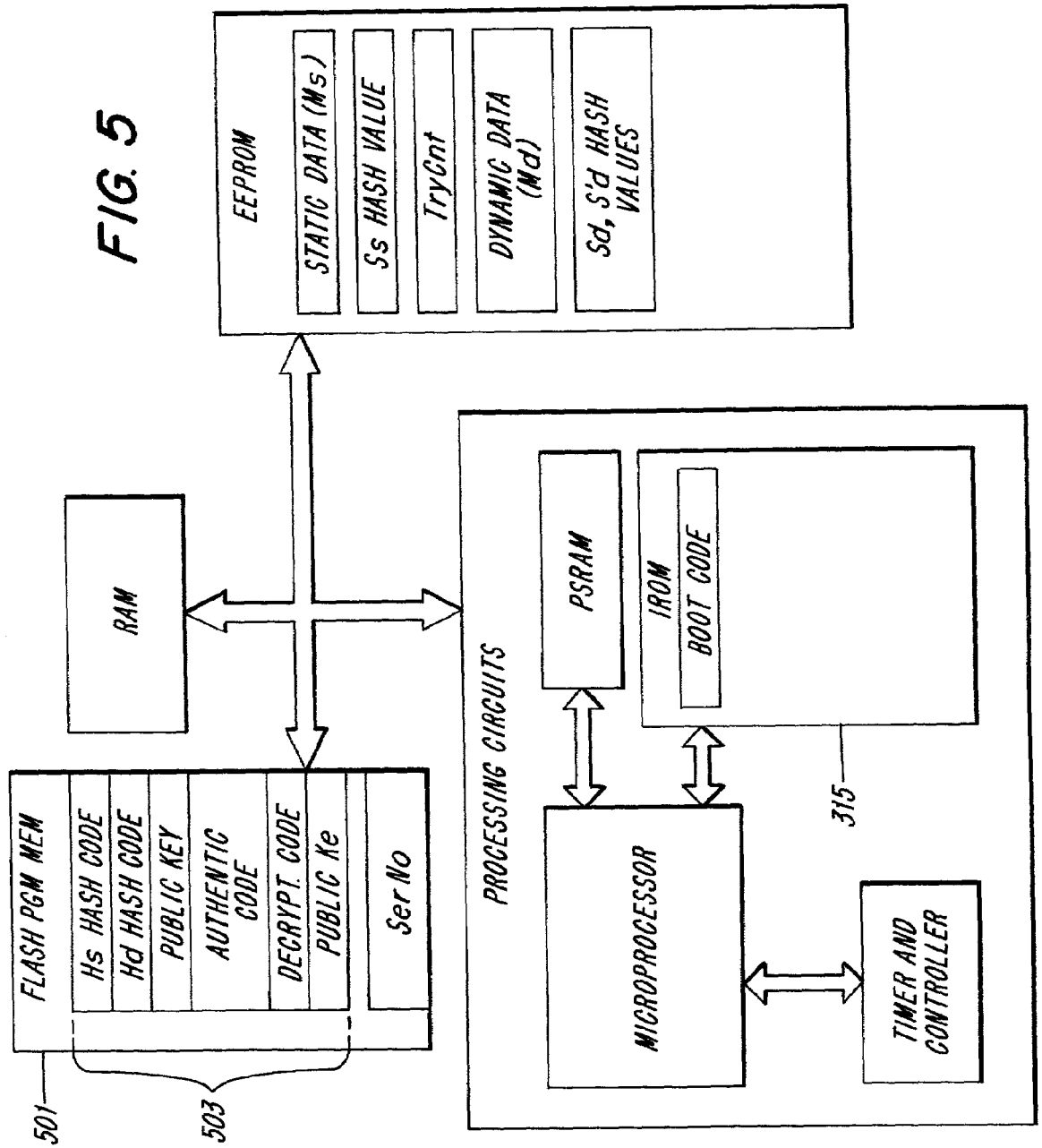
FIG. 5 is a block diagram of an apparatus for protecting the integrity of dynamic data stored in a memory in accordance with an alternative embodiment of the invention.

The embodiments described above can entail some additional expense to implement because they require the use of non-standard processing circuits (e.g., circuits that include not only a standard microprocessor, but also particular program code and parameters stored in an ASIC's IROM). This cost is avoided in yet another alternative embodiment, which is illustrated in the block diagram of FIG. 5. In this embodiment, all of the program code and parameters associated with the static and dynamic data integrity mechanisms are stored in the flash program memory 501 instead of in the IROM 315. In order to eliminate the possibility of a malicious user simply reprogramming this data in the flash program memory, a flash program memory whose contents can partly be frozen or locked (i.e., made non-reprogrammable) after being programmed should be used. In FIG. 5, this program code and associated parameters are shown stored in a lockable portion 503 of the flash program memory 501.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in anyway. The scope of the invention is given by the appended claims, rather than the preceding description, and all variations and equivalents which fall within the range of the claims are intended to be embraced therein.

What is claimed is:

1. A method of ensuring the integrity of a dynamic data object that comprises one or more dynamic data items, the method comprising:

storing the dynamic data object in a memory;

storing dynamic authorization data in the memory;

using a first dynamic hash algorithm to generate an initial first dynamic audit hash value from one or more parameters that include the dynamic data object;

using a second dynamic hash algorithm to generate an initial second dynamic audit hash value from one or more parameters that include the dynamic authorization data;

storing the initial first dynamic audit hash value in the memory;

storing the initial second dynamic audit hash value in the memory;

determining whether a user is authorized to modify the dynamic data object;

if the user is not authorized to modify the dynamic data object, then:

adjusting the dynamic authorization data;

storing the adjusted dynamic authorization data in the memory;

using the second dynamic hash algorithm to generate an adjusted second dynamic audit hash value from one or more parameters that include the adjusted dynamic authorization data; and storing the adjusted second dynamic audit hash value in the memory; and if the user is authorized to modify the dynamic data object, then:

permitting the user to modify the dynamic data object;

storing the modified dynamic data object in the memory;

using the first dynamic hash algorithm to generate an adjusted first dynamic audit hash value from one or more parameters that include the modified dynamic data object; and storing the adjusted first dynamic audit hash value in the memory.

2. The method of claim 1, wherein the one or more parameters from which the second dynamic audit hash value is generated further includes a parameter related to the dynamic data object; and further comprising:

if the user is authorized to modify the dynamic data object, then:

using the second dynamic hash algorithm to generate an adjusted second dynamic audit hash value from the one or more parameters that include the modified dynamic data object, the predefined value and the static parameter; and storing the adjusted second dynamic audit hash value in the memory.

3. The method of claim 1, further comprising:

before permitting the user to modify the dynamic data object, making a determination of whether the dynamic data object is the product of an unauthorized modification, wherein the determination is made by:

using the first dynamic hash algorithm to generate an expected first dynamic audit hash value from the one or more parameters that include the dynamic data object;

using the second dynamic hash algorithm to generate an expected second dynamic audit hash value from the one or more parameters that include the dynamic authorization data;

comparing the expected first dynamic audit hash value with the initial first dynamic audit hash value that was stored in the memory and indicating that the dynamic data object is the product of an unauthorized modification if the expected first dynamic audit hash value does not match the initial first dynamic audit hash value that was stored in the memory; and comparing the expected second dynamic audit hash value with the initial second dynamic audit hash value that was stored in the memory and indicating that the dynamic data object is the product of an unauthorized modification if the expected second dynamic audit hash value does not match the initial second dynamic audit hash value that was stored in the memory.

4. The method of claim 3, wherein the determination of whether the dynamic data object is the product of an unauthorized modification is made prior to determining whether the user is authorized to modify the dynamic data object.

5. The method of claim 1, wherein the first dynamic hash algorithm is the same as the second dynamic hash algorithm.

6. The method of claim 1, wherein the dynamic authorization data includes a failed attempt counter value that represents how many failed attempts to obtain authorization to modify the dynamic data object have been made.

7. The method of claim 1, wherein:
the method is implemented in a first device; and
wherein the one or more parameters from which the first dynamic audit hash value is generated further includes a static parameter.

8. The method of claim 7, wherein the static parameter is a serial number that distinguishes the first device from a second device.

9. The method of claim 8, wherein the one or more parameters from which the second dynamic audit hash value is generated further includes the static parameter.

10. The method of claim 1, wherein:
the method is implemented in a first device; and
wherein the one or more parameters from which the second dynamic audit hash value is generated further includes a static parameter.

11. The method of claim 10, wherein the static parameter is a serial number that distinguishes the first device from a second device.

12. The method of claim 1, wherein the one or more parameters from which the first dynamic audit hash value is generated further includes a static audit hash value that was generated as a function of a static data object by a static hash algorithm.

13. The method of claim 12, wherein the static hash algorithm is the same as the first dynamic hash algorithm.

14. The method of claim 13, wherein the first dynamic hash algorithm is the same as the second dynamic hash algorithm.

15. The method of claim 1, wherein determining whether the user is authorized to modify the dynamic data object comprises:
receiving an access code from the user; and
determining whether the access code is an authorized access code.

16. The method of claim 15, wherein determining whether the access code is the authorized access code comprises:
retrieving an encrypted authorized access code from a memory;
decrypting the encrypted authorized access code; and
comparing the decrypted authorized access code with the access code received from the user.

17. The method of claim 15, wherein determining whether the access code is the authorized access code comprises:
retrieving an encrypted authorized access code from a memory;
encrypting the access code received from the user; and
comparing the retrieved encrypted authorized access code with the encrypted access code received from the user.

18. A method of determining whether a dynamic data object that is stored in a memory is the product of an unauthorized modification, the method comprising:
retrieving an initial first dynamic audit hash value from the memory;
retrieving an initial second dynamic audit hash value from the memory;
using a first dynamic hash algorithm to generate an expected first dynamic audit hash value from one or more parameters that include the dynamic data object;
using a second dynamic hash algorithm to generate an expected second dynamic audit hash value from one or more parameters that include dynamic authorization data;
comparing the expected first dynamic audit hash value with the initial first dynamic audit hash value that was retrieved from the memory and indicating that the dynamic data object is the product of an unauthorized modification if the expected first dynamic audit hash value does not match the initial first dynamic audit hash value that was retrieved from the memory; and
comparing the expected second dynamic audit hash value with the initial second dynamic audit hash value that was retrieved from the memory and indicating that the dynamic data object is the product of an unauthorized modification if the expected second dynamic audit hash value does not match the initial second dynamic audit hash value that was retrieved from the memory.

19. An apparatus for ensuring the integrity of a dynamic data object that comprises one or more dynamic data items, the apparatus comprising:
logic that stores the dynamic data object into a memory;
logic that stores dynamic authorization data into the memory;
logic that uses a first dynamic hash algorithm to generate an initial first dynamic audit hash value from one or more parameters that include the dynamic data object;
logic that uses a second dynamic hash algorithm to generate an initial second dynamic audit hash value from one or more parameters that include the dynamic authorization data;
logic that stores the initial first dynamic audit hash value into the memory;
logic that stores the initial second dynamic audit hash value into the memory;
logic that determines whether a user is authorized to modify the dynamic data object;
logic that, if the user is not authorized to modify the dynamic data object, performs:
adjusting the dynamic authorization data;
storing the adjusted dynamic authorization data in the memory;
using the second dynamic hash algorithm to generate an adjusted second dynamic audit hash value from one or more parameters that include the adjusted dynamic authorization data; and
storing the adjusted second dynamic audit hash value in the memory; and
logic that, if the user is authorized to modify the dynamic data object, performs:
permitting the user to modify the dynamic data object;
storing the modified dynamic data object in the memory;
using the first dynamic hash algorithm to generate an adjusted first dynamic audit hash value from one or more parameters that include the modified dynamic data object; and
storing the adjusted first dynamic audit hash value in the memory.

20. The apparatus of claim 19, wherein the one or more parameters from which the second dynamic audit hash value is generated further includes a parameter related to the dynamic data object; and
further comprising:
logic that, if the user is authorized to modify the dynamic data object, performs:
using the second dynamic hash algorithm to generate an adjusted second dynamic audit hash value from the one or more parameters that include the modified dynamic data object, the predefined value and the static parameter; and storing the adjusted second dynamic audit hash value in the memory.

21. The apparatus of claim 19, further comprising:
logic that operates before permitting the user to modify the dynamic data object, to make a determination of whether the dynamic data object is the product of an unauthorized modification, wherein the determination is made by:
    using the first dynamic hash algorithm to generate an expected first dynamic audit hash value from the one or more parameters that include the dynamic data object;
    using the second dynamic hash algorithm to generate an expected second dynamic audit hash value from the one or more parameters that include the dynamic authorization data;
    comparing the expected first dynamic audit hash value with the initial first dynamic audit hash value that was stored in the memory and indicating that the dynamic data object is the product of an unauthorized modification if the expected first dynamic audit hash value does not match the initial first dynamic audit hash value that was stored in the memory; and
    comparing the expected second dynamic audit hash value with the initial second dynamic audit hash value that was stored in the memory and indicating that the dynamic data object is the product of an unauthorized modification if the expected second dynamic audit hash value does not match the initial second dynamic audit hash value that was stored in the memory.

22. The apparatus of claim 21, wherein the determination of whether the dynamic data object is the product of an unauthorized modification is made prior to determining whether the user is authorized to modify the dynamic data object.

23. The apparatus of claim 19, wherein the first dynamic hash algorithm is the same as the second dynamic hash algorithm.

24. The apparatus of claim 19, wherein the dynamic authorization data includes a failed attempt counter value that represents how many failed attempts to obtain authorization to modify the dynamic data object have been made.

25. The apparatus of claim 19, wherein:
the apparatus is implemented in a first device; and
wherein the one or more parameters from which the first dynamic audit hash value is generated further includes a static parameter.

26. The apparatus of claim 25, wherein the static parameter is a serial number that distinguishes the first device from a second device.

27. The apparatus of claim 26, wherein the one or more parameters from which the second dynamic audit hash value is generated further includes the static parameter.

28. The apparatus of claim 19, wherein:
the apparatus is implemented in a first device; and
wherein the one or more parameters from which the second dynamic audit hash value is generated further includes a static parameter.

29. The apparatus of claim 28, wherein the static parameter is a serial number that distinguishes the first device from a second device.

30. The apparatus of claim 19, wherein the one or more parameters from which the first dynamic audit hash value is generated further includes a static audit hash value that was generated as a function of a static data object by a static hash algorithm.

31. The apparatus of claim 30, wherein the static hash algorithm is the same as the first dynamic hash algorithm.

32. The apparatus of claim 31, wherein the first dynamic hash algorithm is the same as the second dynamic hash algorithm.

33. The apparatus of claim 19, wherein the logic that determines whether the user is authorized to modify the dynamic data object comprises:
    logic that receives an access code from the user; and
    logic that determines whether the access code is an authorized access code.

34. The apparatus of claim 33, wherein the logic that determines whether the access code is the authorized access code comprises:
    logic that retrieves an encrypted authorized access code from a memory;
    logic that decrypts the encrypted authorized access code; and
    logic that compares the decrypted authorized access code with the access code received from the user.

35. The apparatus of claim 33, wherein the logic that determines whether the access code is the authorized access code comprises:
    logic that retrieves an encrypted authorized access code from a memory;
    logic that encrypts the access code received from the user; and
    logic that compares the retrieved encrypted authorized access code with the encrypted access code received from the user.

36. An apparatus for determining whether a dynamic data object that is stored in a memory is the product of an unauthorized modification, the apparatus comprising:
    logic that retrieves an initial first dynamic audit hash value from the memory;
    logic that retrieves an initial second dynamic audit hash value from the memory;
    logic that uses a first dynamic hash algorithm to generate an expected first dynamic audit hash value from one or more parameters that include the dynamic data object;
    logic that uses a second dynamic hash algorithm to generate an expected second dynamic audit hash value from one or more parameters that include dynamic authorization data;
    logic that compares the expected first dynamic audit hash value with the initial first dynamic audit hash value that was retrieved from the memory and indicating that the dynamic data object is the product of an unauthorized modification if the expected first dynamic audit hash value does not match the initial first dynamic audit hash value that was retrieved from the memory; and
    logic that compares the expected second dynamic audit hash value with the initial second dynamic audit hash value that was retrieved from the memory and indicating that the dynamic data object is the product of an unauthorized modification if the expected second dynamic audit hash value does not match the initial second dynamic audit hash value that was retrieved from the memory.

* * * * *